(12) United States Patent
Hoogland

(10) Patent No.: US 7,833,462 B2
(45) Date of Patent: Nov. 16, 2010

(54) METHOD AND APPARATUS FOR MANUFACTURING VEHICLE PARTS

(75) Inventor: Hendricus Antonius Hoogland, Wormer (NL)

(73) Assignee: ECIM Technologies B.V., Zaandam (NL)

( * ) Notice: Subject to any disclaimer, the term of this patent is extended or adjusted under 35 U.S.C. 154(b) by 767 days.

(21) Appl. No.: 10/555,685

(22) PCT Filed: May 10, 2004

(86) PCT No.: PCT/NL2004/000310

§ 371 (c)(1),
(2), (4) Date: Sep. 27, 2006

(87) PCT Pub. No.: WO2004/099480

PCT Pub. Date: Nov. 18, 2004

(65) Prior Publication Data

US 2007/0104955 A1    May 10, 2007

(30) Foreign Application Priority Data

May 8, 2003 (NL) .................................... 1023365

(51) Int. Cl.
*B29C 45/56* (2006.01)
(52) U.S. Cl. ................. 264/328.7; 264/259; 264/297.2; 264/328.1; 264/328.8; 425/330; 425/441; 425/555; 425/590
(58) Field of Classification Search ................ 264/239, 264/328.7, 328.1, 234, 241, 250, 254, 255, 264/259, 297.2, 314, 328.8; 425/555, 577, 425/441, 443, 112, 129.1, 330, 450.1, 590

See application file for complete search history.

(56) References Cited

U.S. PATENT DOCUMENTS

| 3,847,525 | A | * | 11/1974 | Bielfeldt et al. .............. 425/555 |
| 4,071,532 | A | * | 1/1978 | Rose ........................ 264/328.7 |
| 4,092,385 | A | * | 5/1978 | Balevski et al. ............. 264/45.5 |
| 4,144,604 | A | * | 3/1979 | Fritschi ....................... 297/391 |
| 4,207,049 | A | * | 6/1980 | Malo et al. ............... 425/129.1 |
| 4,522,778 | A |  | 6/1985 | Baciu et al. |
| 4,639,341 | A | * | 1/1987 | Hanamoto et al. ......... 264/40.1 |
| 4,708,839 | A | * | 11/1987 | Bellet et al. ................... 264/85 |

(Continued)

FOREIGN PATENT DOCUMENTS

DE    195 31 143 A1    2/1997

(Continued)

*Primary Examiner*—Eric Hug
*Assistant Examiner*—Seyed Masoud Malekzadeh
(74) *Attorney, Agent, or Firm*—Hoffman & Baron, LLP

(57) ABSTRACT

The invention relates to a method for manufacturing at least partly plastic vehicle parts in a mold with at least one mold cavity, comprising the steps of: at least partly closing the mold, wherein the at least one mold cavity is brought in a first position by means of at least one movable wall part of the at least one mold cavity; introducing plastic into the at least one mold cavity; upon complete closure of the mold and/or movement of the at least one movable wall part, bringing the at least one mold cavity in a second position, the at least one mold cavity in the second position having a different volume than in the first position; all this in such a manner that by bringing the at least one mold cavity from the first into the second position, the plastic fills the respective mold cavity completely.

18 Claims, 3 Drawing Sheets

U.S. PATENT DOCUMENTS

| | | | | |
|---|---|---|---|---|
| 4,900,242 A | * | 2/1990 | Maus et al. | 425/149 |
| 5,053,179 A | * | 10/1991 | Masui et al. | 264/257 |
| 5,122,043 A | * | 6/1992 | Matthews | 425/77 |
| 5,154,872 A | * | 10/1992 | Masui et al. | 264/266 |
| 5,178,815 A | * | 1/1993 | Yokote et al. | 264/259 |
| 5,204,127 A | * | 4/1993 | Prusha | 425/544 |
| 5,206,040 A | * | 4/1993 | Gellert | 425/549 |
| 5,281,383 A | * | 1/1994 | Ueki et al. | 264/259 |
| 5,292,465 A | * | 3/1994 | Kobayashi et al. | 264/45.5 |
| 5,346,659 A | * | 9/1994 | Buhler et al. | 264/68 |
| 5,395,580 A | * | 3/1995 | Morita et al. | 264/266 |
| 5,529,483 A | * | 6/1996 | Abe et al. | 425/589 |
| 5,543,094 A | * | 8/1996 | Hara et al. | 264/46.4 |
| 5,582,789 A | * | 12/1996 | Stein et al. | 264/46.4 |
| 5,593,700 A | * | 1/1997 | Stilgenbauer | 425/3 |
| 5,618,485 A | * | 4/1997 | Gajewski | 264/255 |
| 5,676,901 A | * | 10/1997 | Higashi et al. | 264/255 |
| 5,750,060 A | * | 5/1998 | Maus et al. | 264/40.5 |
| 5,830,402 A | * | 11/1998 | Harada et al. | 264/266 |
| 5,968,437 A | * | 10/1999 | Harada | 264/266 |
| 6,045,732 A | * | 4/2000 | Nakatsuji et al. | 264/46.4 |
| 6,143,226 A | * | 11/2000 | Fujimoto et al. | 264/255 |
| 6,180,043 B1 | * | 1/2001 | Yonemochi et al. | 264/255 |
| 6,203,744 B1 | * | 3/2001 | Hara et al. | 264/266 |
| 6,238,197 B1 | * | 5/2001 | Van Hout et al. | 425/168 |
| 6,422,851 B2 | * | 7/2002 | Kang | 425/116 |
| 6,500,376 B1 | | 12/2002 | Pack et al. | |
| 6,517,755 B1 | * | 2/2003 | Okamoto et al. | 264/40.5 |
| 6,524,511 B1 | | 2/2003 | Ueki et al. | |
| 7,090,800 B2 | * | 8/2006 | Clarke | 264/328.7 |
| 7,462,314 B2 | * | 12/2008 | Feick | 264/255 |
| 2007/0063386 A1 | * | 3/2007 | Seaver | 264/328.7 |

FOREIGN PATENT DOCUMENTS

| | | |
|---|---|---|
| EP | 0 692 362 A1 | 1/1996 |
| EP | 0 703 307 A1 | 3/1996 |
| EP | 0 795 386 A1 | 9/1997 |
| EP | 0 999 023 A1 | 5/2000 |
| NL | 1019320 | 4/2003 |
| WO | WO 02/00413 A1 | 1/2002 |
| WO | WO 03/039838 A1 | 5/2003 |

* cited by examiner

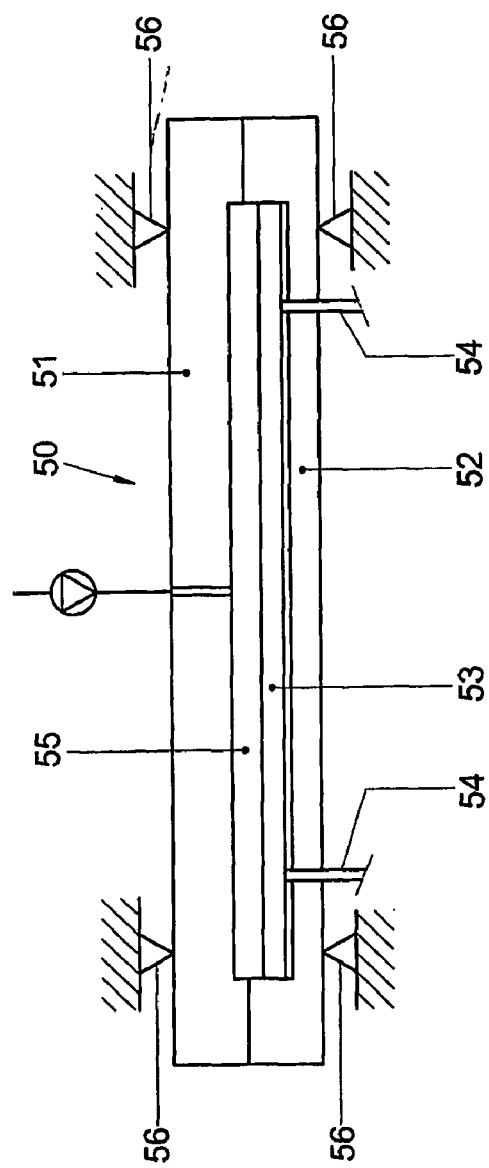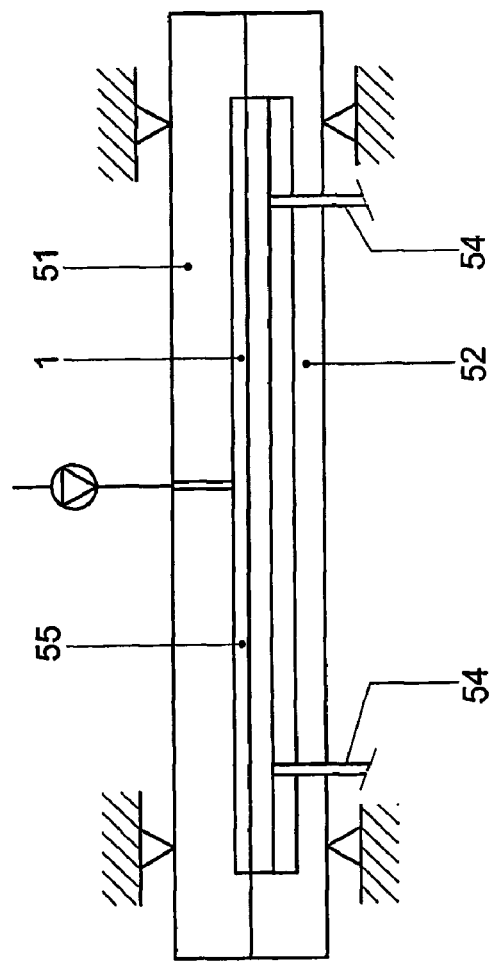

METHOD AND APPARATUS FOR MANUFACTURING VEHICLE PARTS

This application is the U.S. National Phase of International Application Number PCT/NL2004/000310 filed on 10 May 2004, which is incorporated herein by reference.

BACKGROUND OF THE INVENTION

The invention relates to a method for manufacturing vehicle parts from plastic in a mold.

Plastic vehicle parts are typically manufactured by injection molding. Because these parts are typically relatively large in proportion to their wall thickness, this requires large, heavy-duty injection molding machines, being costly in purchase and use. Enlarging the wall thicknesses, which renders flowing easier, entails a prolonged injection molding cycle, increased material use, increased weight and can lead to unwanted stresses. This is therefore an undesirable solution.

It has previously been proposed to make use of cascade injection molding techniques, whereby a flow front moving through the mold is obtained. However, this requires special injection molding machines and peripheral equipment therefor and makes placement of inserts such as labels and the like, fastening elements and strengthening elements difficult to apply.

The object of the invention is to provide a method for manufacturing vehicle elements, whereby at least a number of the drawbacks known from the prior art are prevented. To that end, a method according to the invention is characterized by the features according to claim 1.

SUMMARY OF THE INVENTION

In a method according to the invention, it has surprisingly been found that, as a consequence, the plastic can be introduced into the mold cavity at relatively low temperature, after which the plastic, through movement of at least one wall part of the mold cavity, is brought into its eventually desired shape. That requires relatively little force and hence relatively little pressure. Without wishing to be bound to any theory, this seems to be at least the result of the fact that as the mold cavity can be temporarily enlarged, the plastic can flow into the mold cavity with less back pressure, while moreover the plastic needed for the part only needs to spread over a smaller surface. Preferably, further, the mold cavity is reduced so fast as to result in adiabatic heat development in the plastic, so that the flow behavior of the plastic is further improved. In reducing the volume of the mold cavity, the plastic is forced in the direction of the ends of the mold cavity, whereby at all times the optimum ratio between the melt flow index and the incidental flow path can be obtained. As a result, the mold can be kept closed with a particularly low closing force compared with closing forces required in conventional injection molding technique for manufacturing a comparable product.

An additional advantage of a method according to the invention is that it allows wall thicknesses to be reduced locally, even to a thickness below that which can be achieved with conventional injection molding technique in a product of comparable dimensions, without unwanted stress concentrations occurring.

With a method according to the invention, furthermore, inserts can be laid in the mold cavity, for fastening in or to the plastic. Since low pressures and flow rates are achieved, these inserts will not be damaged, at least less easily than in conventional technique. Thus, for instance, labels, in particular in-mold labels, can be placed for obtaining a desired finish. For instance, decorative labels can be used for coloring or patterns, such as, for instance, wood finish. Also, natural materials can be used, for instance wood. Further, inserts can be used that are based on textile, such as woven or nonwoven textile. With such inserts, covering panels can be manufactured in one piece, in one production pass, while moreover a switch in material for the covering can be made particularly fast and simply.

Thus, for instance, an inner covering panel for a door, seat, wall finish, roof lining or the like can be manufactured, with one side covered with a fabric covering matching the interior of the vehicle. Fabric or textile is here understood to mean at least comprising natural or synthetic woven or nonwoven materials. It is then preferred that the textile, at least the fabric, is provided with a plastic backing and/or plastic threads or threads which are covered with plastic, for instance as warp and/or weft, so that a proper connection can be obtained with the plastic from which the part is manufactured.

Also plate parts can be manufactured for, for instance, the outside of a vehicle, such as bodywork parts for a car or boat or covering panels for airplanes and ships. With the aid of labels or the like, a desired profiling or other surface finish can be directly obtained, for instance drop or rib structures for influencing air resistance, flow, dirt repulsion and the like.

In an alternative embodiment, in a mold, a part is built up by injection molding different layers against each other, as described in claim 8.

In such a method, the volume of the mold cavity is enlarged each time after an injection molding pass, after which a new layer of plastic is introduced into the thus created space. Thus, for instance, in a light unit, first a gleaming inner layer for a reflector can be injection molded, after which a support is formed from a suitable plastic against the "outer side" thereof, or vice versa. Also, in this way, sandwich constructions can be manufactured. Thus, manufacturing costs can be considerably reduced and accuracy enhanced, while mechanical properties can be considerably improved.

Preferably, when injecting plastic via an injection point such as a hot runner, the volume of the mold cavity is enlarged and subsequently reduced to the shape of the desired product. Alternatively, the movable wall part can also be pushed away by the injected plastic, so that a constant back pressure is maintained and a suitable flow path melt flow index ratio is maintained at all times. Such a method is particularly suitable for, for instance, PET.

A method and mold according to the invention can be used particularly suitably for a variety of covering elements such as TRIM parts and the like, plating, bodywork parts and the like.

The speed of moving the or each movable wall part is preferably chosen to be higher than the speed at which the mold is opened and/or closed. The closing pressure can be kept relatively low, for instance lower than the injection pressure for the plastic, at least lower than such an injection pressure for conventional injection molding of a comparable product.

In the further claims, advantageous embodiments of the invention are shown and described.

BRIEF DESCRIPTION OF THE DRAWINGS

To clarify the invention, exemplary embodiments of a method and apparatus according to the invention, as well as of products thereby obtained are presently described with reference to the drawing, wherein:

FIG. 1 shows schematically in sectional side view a mold for manufacturing a vehicle part according to the invention, in a first phase of manufacture;

FIG. 2 shows the mold according to FIG. 1 during a second phase of manufacture;

DETAILED DESCRIPTION OF THE INVENTION

Figure 3A:
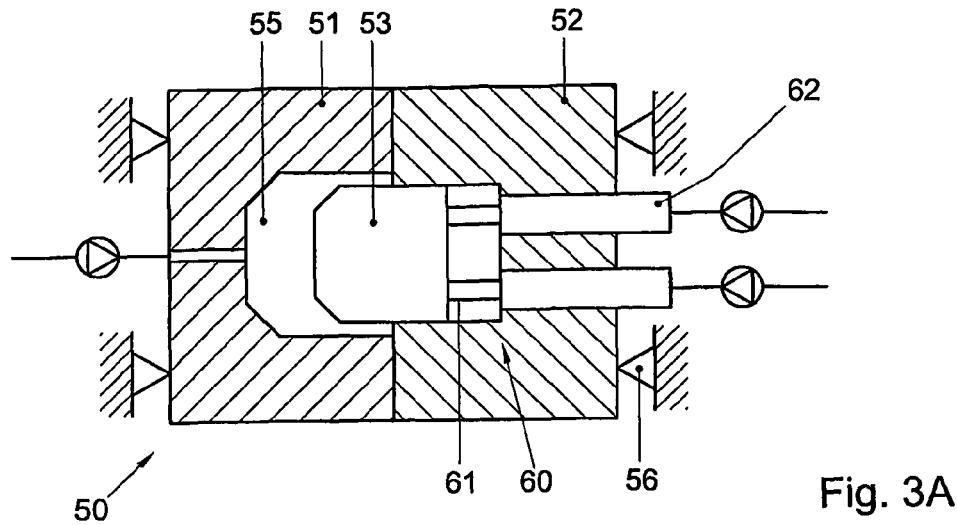
FIGS. 3A-C show an alternative embodiment of a mold according to the invention.

In this description, the same or corresponding parts have the same or corresponding reference numerals.

The exemplary embodiments shown in the drawing are shown only by way of illustration and should not be construed as limiting in any way.

In FIG. 1, a mold 50 is shown, comprising a first part 51 and a second part 52, while in the second part 52 a movable wall part 53 is provided, operable from outside of the mold 50 by arms 54, schematically represented in FIGS. 1 and 2. Within the mold 50, a mold cavity 55 is recessed, a portion of which is defined by the movable wall part 53. In the mold cavity 55, a vehicle part 1, such as a covering element, can be formed. When injection molding is started, plastic is introduced into the mold cavity 55 with movable wall part 53 retracted in a first position, that is, the space of the mold cavity 55 is relatively large. Next, when the mold cavity 55 is substantially completely filled with plastic, for instance upwards of 80%, the movable wall part 53 is moved in the direction of the first part 51 to a second position, so that the volume of the mold cavity decreases to the desired end volume, while or whereupon holding pressure is applied in the usual manner to fill the mold cavity completely and obtain a substantially stress-free product. In the position shown in FIG. 2, a vehicle part 1 has been formed being wholly dimensionally stable. It is clear that during injection molding, the mold 50 is kept closed, represented schematically by closing elements 56. With such a method, in a particularly simple manner, a part 1 can be manufactured which is relatively dimensionally stable, using relatively light tools, and moreover a high degree of freedom in the choice of plastic is obtained. This is because by virtue of the movable wall part, during the major part of the filling of the mold, large flow paths are obtained, so that plastics having a high as well as plastics having a very low melt can be used.

Figure 3B:
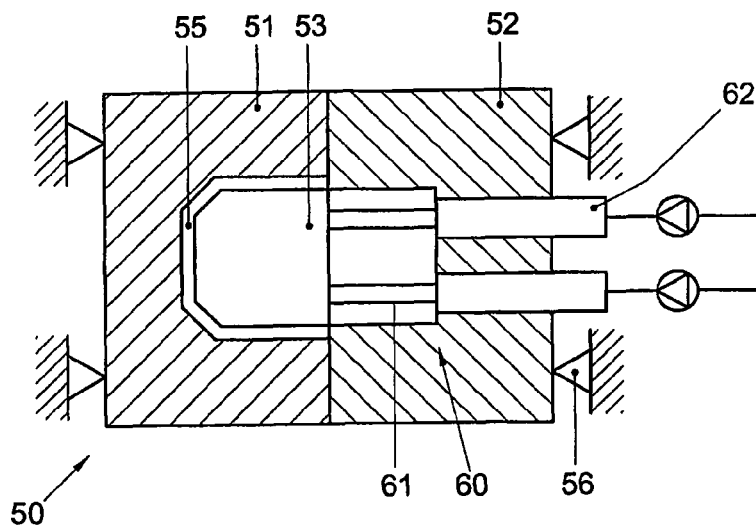
Figure 3C:
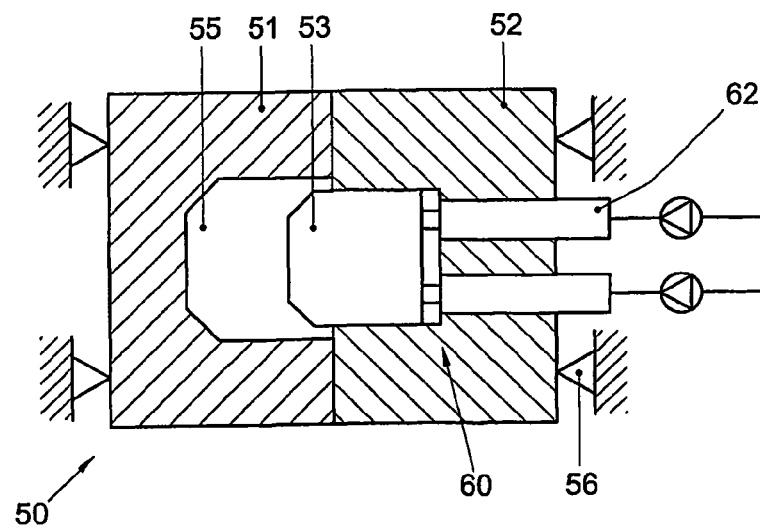

FIG. 3 schematically shows in sectional side view an alternative embodiment of a mold 50 according to the invention, again with two mold parts 51, 52 and a mold cavity 55. The mold cavity 55 in this embodiment is bounded on one side by a movable wall part 53, controllably movable with the aid of drive means 60, such as piston rods 61 movable by pistons 62. Of course, there may be different operating means, for instance screw means, electrically operable means, pneumatic means and the like. With these, the movable wall part 53 can be moved to a first position, shown in FIG. 3A; to a second position, in which the volume of the mold cavity 55 is reduced, as shown in FIG. 3B; or to a third position, as shown in FIG. 3C, in which the volume is increased still further.

Figure 4:
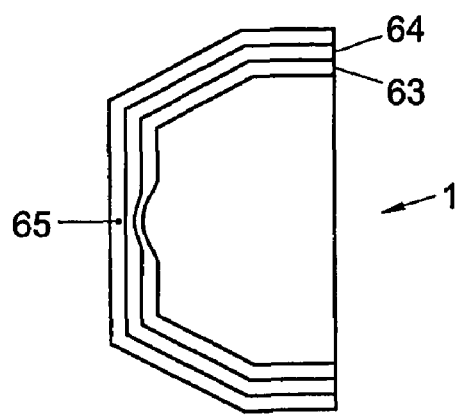
FIG. 4 shows schematically in sectional side view a vehicle part manufactured with a mold according to FIG. 3.

With such a mold 50, for instance a product as shown in FIG. 4 can be manufactured. In this case, a label 63 has been laid, for instance, on the wall part 53 or on the opposite part 51. Next, a first layer of plastic 64 has been injected against the label. Next, the movable wall part 53 has been retracted into the third position as shown in FIG. 3C, after which a second layer of plastic 65 has been injection molded against it. Thus, a sandwich construction has been obtained. The label 63 and/or the first layer 64 can be, for instance, reflecting and resistant to, for instance, heating by lamps, while the second layer of plastic 65 can serve as carrier.

It will be clear that with a comparable mold, also multiple layers can be provided and that also differently shaped products can be manufactured, for instance sandwich panels and the like.

Figure 5:
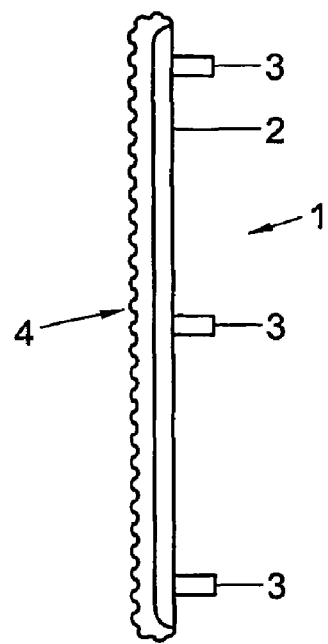
FIG. 5 shows in sectional side view a covering panel according to the invention.

FIG. 5 shows schematically in sectional side view a covering panel for, for instance, a door, seat, wall or like vehicle parts. This vehicle part comprises a plate-shaped carrier 2, which can be mounted in a vehicle, for instance in a door, with mounting lugs 3 which have been integrally injection molded or have been provided as inserts. On the opposite side, a covering 4 is provided, substantially manufactured from textile in the embodiment shown. This can be a woven or non-woven textile, preferably matching a vehicle interior. The textile may be manufactured from synthetic and from natural materials. This covering 4 has been arranged by placing it in a mold cavity 55, similarly to in-mold labeling technique, after which the panel 2 has been formed against it with a method as described earlier. As a result of the relatively low pressures that occur in the mold cavity and relatively low temperatures, at least on the side of the textile, a covering panel can be obtained in one piece in this way.

Figure 6:
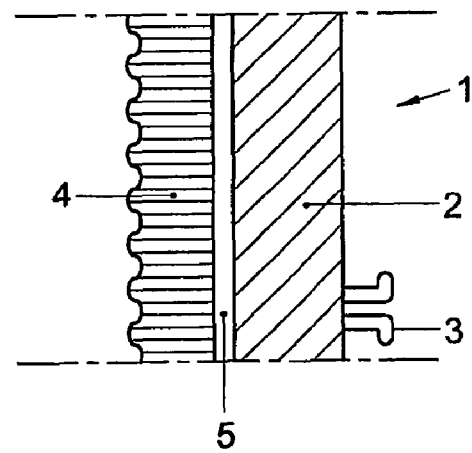
FIG. 6 shows, enlarged, a portion of a panel according to FIG. 5.

FIG. 6 shows, enlarged, a portion of a panel 1 according to FIG. 5, comprising the panel 2 and the covering 4. It shows that the covering 4 is provided with a carrier 5 manufactured from a plastic compatible with the plastic of the panel 2, such that these are connected through fusion and/or chemical bonding. As a result, a proper connection has been obtained. Moreover, the textile of the covering 4 is protected by the layer 5. Alternatively, a woven textile can be used, with at least a portion of warp and/or weft being provided with a plastic covering or being designed in plastic, comparably compatible with the plastic of the panel 2. In that way too, a proper connection can be obtained.

Figure 7:
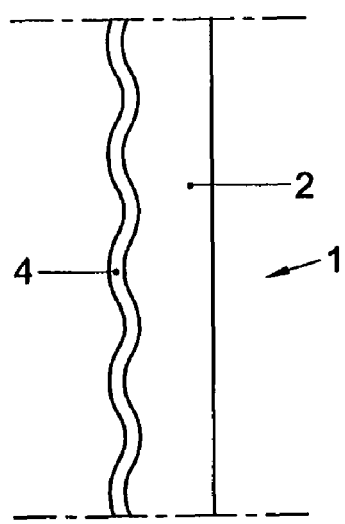
FIG. 7 shows in sectional side view a portion of an alternative embodiment of a covering panel according to the invention.

FIG. 7 shows schematically an alternative embodiment of a panel 1 according to the invention, again comprising a carrier 2 with a covering 4, which covering, in this embodiment, is arranged as a label, for instance for decorative purposes. The label 4 can have a profiling, for instance ribs, drops or the like, so that flow can be influenced, resistance can be changed, the appearance can be modified, and so forth.

With a method according to the present invention, vehicle parts can be manufactured for, for instance, cars, airplanes, and ships, in particular trim elements, such as inner coverings, dashboards, roof lining and door covering elements, or external covering elements, such as plating parts, bumpers, engine covering and guarding parts, parts of seats, seat benches, bodywork parts and the like. Also, in this way, for instance complete doors, hoods, boot lids and the like can be manufactured, as well as sliding roofs and the like.

In an alternative embodiment, the movable wall part 53 is held in a forwardly moved second position during injection of plastic, so as to be pushed away by the plastic to the first position. This is specifically advantageous for, for instance, low melt plastics or plastics such as PET, specifically if these are to be translucent.

The invention is not limited in any way to the embodiments as shown and described. Many variations thereon are possible within the framework of the invention outlined by the claims.

Thus, also other parts can be manufactured with a method according to the invention, in particular according to claim 8. Also, multiple movable wall parts can be combined in a mold cavity, which can be moved simultaneously or sequentially. The movable wall parts can move both rectilinearly and along curves, for instance for the controlled displacement of plastic. The plastic can be introduced in molten condition but may also be introduced as granulate or the like directly into the mold cavity.

Parts manufactured with a method according to the invention can be provided on one or more, sides with a finish or covering such as textile or label, for instance from plastic.

What is claimed is:

1. A method for manufacturing at least partly plastic vehicle parts in a mold with at least one mold cavity, comprising the steps of:
   at least partly closing the mold, wherein the at least one mold cavity is brought in a first position by moving at least one wall part of the at least one mold cavity;
   introducing plastic into the at least one mold cavity, the plastic being introduced in a molten condition;
   upon complete closure of the mold and/or movement of said at least one movable wall part, bringing the at least one mold cavity in a second position, the at least one mold cavity in said the having a smaller volume than in the first position;
   by bringing the at least one mold cavity from the first position to the second position, the plastic fills the respective mold cavity completely, the mold being provided with the at least one mold cavity with the at least one movable wall part, wherein operating means are provided for a controlled movement of said wall part between at least the first and the second position, wherein a displacement of said wall part is controlled such that during use adiabatic heat development occurs in plastic in the mold cavity through pressure change in and/or displacement of the plastic.

2. A method according to claim 1, wherein at least one insert, is laid in or is formed in the at least one mold cavity, which insert is connected with the plastic in the mold.

3. A method according to claim 2, wherein said at least one insert is a covering element, wherein said covering element is at least partly manufactured from textile.

4. A method according to claim 2, wherein said at least one insert is a covering element, wherein said covering element is at least partly manufactured from plastic.

5. A method according to claim 4, wherein said covering element plastic and said introduced plastic being at least one of connected through fusion and chemical bonding.

6. A method according to claim 1, wherein said wall part is moved by at least the plastic which is introduced into the respective mold cavity.

7. A method for manufacturing products in a mold according to claim 1, wherein after introduction of plastic into the at least one mold cavity, the at least one mold cavity, is enlarged in volume, after which a second plastic is introduced into the thus obtained space in the mold cavity.

8. A method according to claim 7, wherein the at least one mold cavity in the first position has a first volume, in the second position a second volume and wherein the volume of said at least one mold cavity, after introduction of said plastic, is enlarged to a third volume, greater than the first and second volume, after which the volume of said at least one mold cavity, after introduction of the second plastic, is reduced to substantially said second volume.

9. A method according to claim 1, wherein vehicle parts are manufactured selected from the group of interior covering elements, external covering elements, guarding parts, parts of seats and seat benches.

10. A method according to claim 1, wherein the plastic is introduced via at least one injection point into the at least one mold cavity and wherein in at least the position in which the plastic is introduced into the at least one mold cavity, flow paths are provided which match a melt-flow index of the respective plastic, at least adjacent the at least one injection point.

11. A method according to claim 1, wherein a speed at which said at least one movable wall part is moved is higher than the speed at which the mold is closed and/or opened.

12. A method according to claim 1, wherein a closing pressure with which the mold is kept closed during movement of the at least one movable wall part is less than an injection pressure for a comparable product in conventional injection molding.

13. A method according to claim 2, wherein said at least one insert is a covering element.

14. A method according to claim 13, wherein said covering element is a label.

15. A method according to claim 4, wherein said plastic is a thermoplastic.

16. A method according to claim 9, wherein the interior covering elements include at least one of trim elements.

17. A method according to claim 16, wherein the trim elements include at least one of inner coverings, dashboards, roof lining and door covering elements.

18. A method according to claim 9, wherein the external covering elements include at least one of plating parts, bumpers and engine covering.

* * * * *

UNITED STATES PATENT AND TRADEMARK OFFICE
CERTIFICATE OF CORRECTION

PATENT NO. : 7,833,462 B2  
APPLICATION NO. : 10/555685  
DATED : November 16, 2010  
INVENTOR(S) : Hoogland It is certified that error appears in the above-identified patent and that said Letters Patent is hereby corrected as shown below:

Title Page:

Now reads:    "(74) Attorney, Agent, or Firm-Hoffman & Baron, LLP"

Should read:   -- (74) Attorney, Agent, or Firm-Hoffmann & Baron, LLP --

Column 5, line 29 Claim 1:

Now reads:    "mold cavity in said the having"

Should read:   -- mold cavity in the second position having --

Signed and Sealed this  
Second Day of August, 2011

David J. Kappos  
*Director of the United States Patent and Trademark Office*